W. A. GEIGER.
TWO-PART YOKE.
APPLICATION FILED FEB. 6, 1915.
1,198,718.
Patented Sept. 19, 1916.
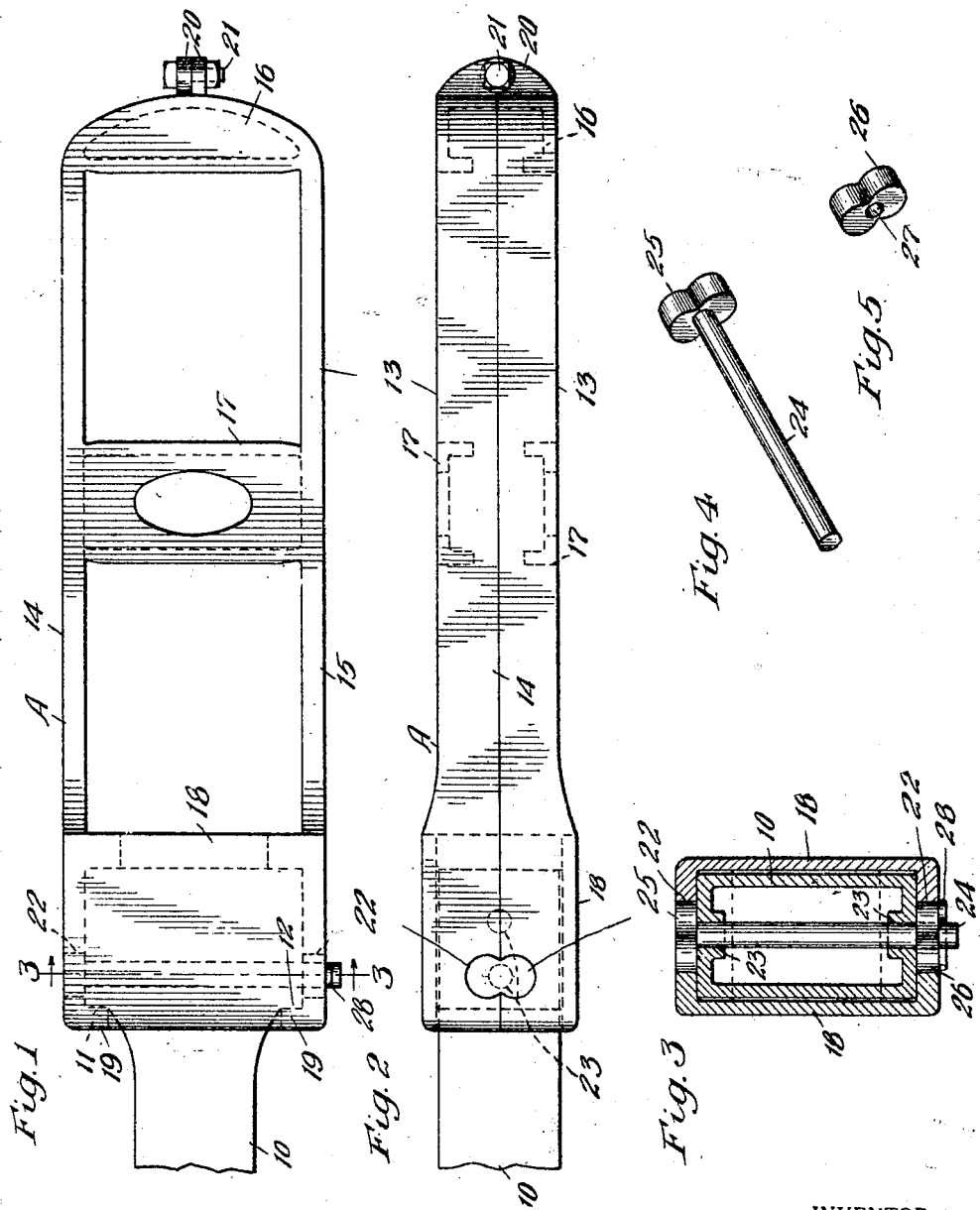
WITNESSES:
Calvin B. Patch
INVENTOR.
William A. Geiger
BY George F. Haight
his ATTORNEY

UNITED STATES PATENT OFFICE.

WILLIAM A. GEIGER, OF CHICAGO, ILLINOIS, ASSIGNOR TO WILLIAM H. MINER, OF CHAZY, NEW YORK.

TWO-PART YOKE.

1,198,718.　　　　Specification of Letters Patent.　　Patented Sept. 19, 1916.

Application filed February 6, 1915. Serial No. 6,486.

*To all whom it may concern:*

Be it known that I, WILLIAM A. GEIGER, a citizen of the United States, residing at Chicago, in the county of Cook and State of Illinois, have invented a certain new and useful Improvement in Two-Part Yokes, of which the following is a full, clear, concise, and exact description, reference being had to the accompanying drawings, forming a part of this specification.

This invention relates to improvements in two part yokes.

An object of the invention is to provide a two part yoke having means associated therewith for preventing lateral separation of the yoke parts when attached to the coupler.

The invention furthermore consists in the improvements in the parts and devices and in the novel combinations of the parts and devices as herein shown, described or claimed.

In the drawing forming a part of this specification, Figure 1 is a side elevation of a structure embodying my improvements. Fig. 2 is a top plan view of the structure shown in Fig. 1. Fig. 3 is a vertical sectional view taken substantially on the line 3—3 of Fig. 1 and Figs. 4 and 5 are detail perspective views showing the locking means employed for preventing separation of the yoke parts.

In said drawing, 10 denotes the draw-bar which is of usual form and provided with upper and lower shoulders 11 and 12 and A represents the yoke. The yoke A comprises two members 13—13 which are of like construction and each of which is shown as provided with an upper horizontal arm 14, lower arm 15, rear connecting piece 16, intermediate web or thimble 17, side plate 18 joining the front ends of the upper and lower arms 14 and 15, and inwardly extending shoulders or gibs 19—19 arranged to engage and coöperate with said shoulders 11 and 12 on the draw-bar. At their rear ends, the yoke members 13—13 are also provided with overlapped perforated ears 20 by which the parts are adapted to be detachably connected together by a bolt or nut 21.

At its front end, each member 13 in the upper and lower wall thereof, is provided with a cut out portion or recess 22 each of which recesses is circular in general contour and of more than half a circle but not a complete circle, the centers of the recesses being offset to one side of the dividing line between the two members 13. These recesses 22—22 are arranged opposite each other in the two members 13 and are also so located as to fall directly above and below one of the usual rivet holes 23 in the draw-bar. To hold the two parts together, I provide locking members which, in the form shown, comprise a pin or bolt 24 having a head 25 thereon and preferably cast integrally therewith, said head 25 corresponding in shape and size to the opposed upper recesses 22—22 in the two members 13—13. The pin or bolt 24 is adapted to fit the rivet hole 23 and passes through the coupler butt and beyond the lower walls of the yoke members. A detachable block 26 is provided which corresponds in shape and size to the head 25 and is perforated as indicated at 27 to slip over the lower end of the pin or bolt 24 and fit within the lower recesses 22—22. Fig. 3 clearly shows the position of the block 26 when the parts are in assembled position and it may be held in position by any suitable means such as the cotter 28.

From the preceding description, it will be seen that I have provided a two part cast yoke which may be attached to a standard draw-bar without any modifications of the latter and without the necessity of any transverse coupler keys. Not only this, but by the aid of the locking means which are so arranged as to be employed with the standard located rivet holes of the draw-bar, the two parts of the yoke are prevented from lateral separation. As will be apparent to those skilled in the art, various changes and modifications may be made in the details and the arrangements of the parts without departing from the spirit of the invention and all such changes and modifications are contemplated as come within the scope of the claims appended hereto.

I claim:—

1. In a draft rigging for railway cars, the combination with a draw bar having upper and lower shoulders and provided with the usual rivet holes, of a yoke comprising two separable members, said members having upper and lower portions extending over the upper and lower surfaces of the draw bar butt and provided also with in-turned shoulders arranged to engage said shoulders on the draw bar, and means for preventing lateral separation of said members, said means comprising a headed pin extending through one of said rivet holes, the portions of said members extending over the upper surface of the draw bar butt being provided with recesses corresponding to the head of said pin, the head and said recesses being inter-locked to prevent lateral separation of the yoke members.

2. A yoke for railway draft riggings comprising two loop members each having upper and lower arms arranged to be brought together, the arms of said members near the front ends thereof being provided with alined recesses which together form a recess of restricted width intermediate its ends, and means for preventing lateral separation of said members, said means including correspondingly shaped elements, arranged to be inserted in said recesses.

3. In a draft rigging for railway cars, the combination with a draw-bar having upper and lower shoulders and provided with a rivet hole therethrough, of a yoke comprising two like, loop members each of which is provided with inwardly turned shoulders arranged to engage said shoulders of the draw-bar, each of said members being also provided with recesses on the upper and lower faces thereof in alinement with said rivet hole, a pin extending through said rivet hole and provided with a head engaging in the upper of said recesses, a block similar in shape to the head of said pin and adapted to fit in the lower of said recesses, and means for detachably holding said block on the lower end of said pin.

WILLIAM A. GEIGER.

Witnesses:
CARRIE G. RANZ,
LUCILLE HIGGINS.